United States Patent
Berner et al.

(10) Patent No.: US 7,614,308 B2
(45) Date of Patent: Nov. 10, 2009

(54) DIAPHRAGM PRESSURE MEASURING CELL ARRANGEMENT

(75) Inventors: Walter Christian Berner, Chur (CH); Jarkko Antila, Mariehamn (FI); Gaétan Duplain, Québec (CA); Per Björkman, Pålsböle (FI); Tove Manselin, Aaland (FI); Oskar Untermarzoner, Ruggell (LI)

(73) Assignee: Inficon GmbH, Bad Ragaz (CH)

( * ) Notice: Subject to any disclaimer, the term of this patent is extended or adjusted under 35 U.S.C. 154(b) by 0 days.

(21) Appl. No.: 12/327,962

(22) Filed: Dec. 4, 2008

(65) Prior Publication Data

US 2009/0158853 A1    Jun. 25, 2009

Related U.S. Application Data

(60) Provisional application No. 61/015,241, filed on Dec. 20, 2007.

(51) Int. Cl.
*G01L 9/12* (2006.01)
(52) U.S. Cl. .......................... 73/724; 73/715; 361/283.4
(58) Field of Classification Search .................. None
See application file for complete search history.

(56) References Cited

U.S. PATENT DOCUMENTS

| | | | |
|---|---|---|---|
| 4,127,840 A * | 11/1978 | House | 338/4 |
| 4,380,041 A | 4/1983 | Ho | |
| 6,528,008 B1 | 3/2003 | Bjoerkman | |
| 6,591,687 B1 | 7/2003 | Bjoerkman et al. | |
| 7,152,478 B2 * | 12/2006 | Peterson et al. | 73/715 |
| 7,240,557 B2 * | 7/2007 | Muller et al. | 73/706 |
| 7,305,888 B2 * | 12/2007 | Walchli et al. | 73/714 |
| 7,427,776 B2 * | 9/2008 | Hoffman et al. | 257/59 |
| 2005/0195402 A1 | 9/2005 | May et al. | |

FOREIGN PATENT DOCUMENTS

| | | |
|---|---|---|
| EP | 372988 | 12/1989 |
| EP | 461459 | 5/1991 |
| WO | WO 2008/122134 | 4/2007 |

* cited by examiner

*Primary Examiner*—Lisa M Caputo
*Assistant Examiner*—Jermaine Jenkins
(74) *Attorney, Agent, or Firm*—Notaro & Michalos P.C.

(57) ABSTRACT

A diaphragm pressure measuring cell arrangement has a housing body at least partly made of sapphire material and a planar sapphire diaphragm with a peripheral edge joined by a first edge seal to the housing body to form a reference vacuum chamber. An outer surface of the diaphragm is exposed to a medium to be measured. A ceramic supporting body is attached to the back side of the housing body by sealing glass and includes a surface area overhanging that surrounds the housing body to form a first sealing surface. A tubular sensor casing incorporates the measuring cell for mounted the ceramic support body, the casing including an inside second surrounding sealing surface corresponding to the first sealing surface. A metal ring seal is between the sealing surfaces and a pressing member presses sealing surfaces together.

22 Claims, 6 Drawing Sheets

DIAPHRAGM PRESSURE MEASURING CELL ARRANGEMENT

CROSS-REFERENCE TO RELATED APPLICATION

This application claims priority on U.S. Provisional Patent Application 61/015,241 filed Dec. 20, 2007, which is incorporated here by reference.

FIELD AND BACKGROUND OF THE INVENTION

The present invention relates in general to high temperature, high pressure sensors for corrosive liquid and gaseous fluids, and in particular to a new and useful metal sealing system for high pressure, high temperature and corrosion resistant ceramic/sapphire based optical diaphragm sensors for use in harsh applications. The invention describes solutions of the problems associated with these requirements particularly the leak tight and corrosion resistant sealing of the sensor cell to the casing, the sealing of the reference chamber of the sensor and the sealing stress relief for achieving long-term stability of the sensor. This technology can also be used for pressure and vacuum sensor applications using optical, electrical or other means of measuring diaphragm deflection, where particularly corrosion resistance is required.

The technical field of the invention includes high temperature, high pressure sensors for corrosive liquid and gaseous fluids, packaging of sapphire/ceramic sensors in metal casings, metal sealing systems, fiber-optic low-coherence interferometry, capacitive deflection measurement, pressure and vacuum sensor applications and especially for oilwell downhole or drilling applications.

Due to the expected shortage of oil in oil reservoirs, high pressure is building up on new offshore sub sea developments as well as on accessing other reservoirs such as oil sands. Therefore new technologies are needed for recovering oil, including pressure and temperature measurement. Pressure measurement will provide a better control of the oil extraction process. It is expected that better management of reservoirs can increase the share of recoverable oil by 10% to 20%.

Pressure measurement is a crucial part of new extraction technologies, particularly Steam Assisted Gravity Drainage (SAGD), for recovery of oil from vast reservoirs of oil sands. Major deposits are located in Canada, Venezuela, United States, Russia and the Middle East.

All those factors contribute to the requirement for new technologies for pressure measurement in increasingly deeper wells, which goes along with higher temperatures and thus more chemically aggressive environments. These are the drivers for new technologies for thermal and chemical resistant high pressure and high temperature sensors, which need to work reliably in several kilometers depth in the 1000 bar range and at several 100° C. Conventional sensors with integrated electronics can no longer work in such demanding environment, as they work only up to the 180° C. range according to their specifications.

A fiber optic system is generally considered to be a viable solution as the completely passive optical sensor can be designed and packaged to fulfill the specific operating conditions and the optical signal then can be transmitted over long distances without loss of signal quality. In addition, since no electrical signals are transmitted, the system is free of EMI problems and is intrinsically safe.

Optical diaphragm gauges have been described in the literature (e.g. Lopez-Higuera, 2002; Totsu et al., 2003). Such an instrument is basically a diaphragm gauge. The readout of the gauge is done by optical means. There are many optical techniques available to measure the distance between two parts. However in practical pressure measurement where distances in the range of a tenth of an Angstrom to a millimeter must be measured, mainly Fabry-Perot principles are used. Primary applications have been chemical process monitoring and biomedical applications. These sensors are typically operated at pressures above atmospheric pressures. Optical methods for the measurement of the membrane displacement at temperatures up to 550° C. have been realized in some commercial products like Luna Innovations' Fiber Optic Pressure Sensor using external Fabry-Perot Interferometry. Sensors by Taitech, FISO Technologies or Davidson Instruments, use Silicon MEMS technology. Virginia Tech has constructed a single-crystal sapphire sensor.

A typical packaging method to attach sapphire/ceramic sensors to a metal housing, either uses elastomer o-ring sealing or brazing. Elastomer sealing systems can not be used for high temperature applications above 150° C. and depending on the elastomer type, also not in conjunction with corrosive media. Brazing leads to permanent bonding and sensors therefore can not be exchanged easily. Furthermore, typical brazing solutions are prone to corrosive attacks and to thermal stress due to mismatch of thermal expansion coefficients of the involved materials, e.g. Vacon, usually used as intermediate material, is not corrosion resistant at elevated temperatures and the corrosive media expected in oilwell downhole applications.

European Patent EP 0 461 459 B1, filed on May 28, 1991 (corresponding to U.S. Pat. No. 5,174,157), describes the sealing of a ceramic pressure cell with a sealing ring consisting of a fluoroelastomer that seals on a glass layer applied on the outer membrane section of the ceramic sensor diaphragm. Such a sealing system can be used in ambient temperature environment but can not be used in high temperature applications above 200° C. and with corrosive media since fluoroelastomers are generally not suitable or not accepted for corrosive applications. Thus, for high temperature and corrosive media applications a metal sealing system would be preferred. Metal seals are generally harder than elastomers and thus one would not expect and it is not obvious such glass coatings to resist the high sealing forces and point loads generated by the hard metal seals. If the hard seal is directly applied on the diaphragm portion of the sensor, then this leads to stress in the sensor which results in initial bending of the sensor and stress relief over time generally recognized as drift of the sensor. In order to avoid such sealing stress on the diaphragm the sealing section of the sensor is not directly on the diaphragm. In cases were the glass layer is not resistant to corrosive media the glass layer needs to be coated with a protective layer of ceramic or other suitable materials.

European Patent EP 0 372 988 B1, filed on Dec. 8, 1989 (corresponding to U.S. Pat. No. 4,888,662) describes the sealing of a capacitive ceramic sensor cell for high pressure applications with o-ring seals of different materials on the diaphragm portion of the sensor with materials softer than polytetrafluoroethylene (Teflon) and includes also metallic materials. Soft metallic materials have the advantage of being deformed by the sealing forces and thus being able to properly seal on the ceramics. The disadvantages of these ductile materials are their low melting points, which makes them not suitable in high temperature applications. Furthermore, they are not resilient in case of gap variations due to thermal mismatch of the sealing system members or due to the pressure applied on the sensor, and in many cases they are not suitable for corrosive applications. Additionally the seal is directly applied on the diaphragm portion of the sensor which leads to stress in the sensor that result in initial bending of the sensor and stress relief over time generally recognized as unwanted drift of the sensor.

Problems/Disadvantages/Deficiencies:

Various pressure-temperature sensors with different technologies are presently used in oilwell downhole applications, among which the major technologies are strain gauges and vibrating wire gauges. Most are limited to temperature ranges compatible with electronics, which is specified to below 200° C., in most cases to 177° C. Based on information from companies in the oil recovery market, sufficient performance for permanent downhole sensors can only be expected up to the 120° C. range, rather than in the specified range. Optical sensors are widely recognized to potentially solve the temperature problem related to the electronics, since no electronics are exposed to high temperature.

The main problem in manufacturing such an optical sensor is to make it withstand the extreme conditions while being stable, sensitive, resistant to corrosive fluids and gases, long-lasting and to be able to reliably connect the signal-transferring fiber-optic cable to the sensor.

An attempt to make a complete all single-crystal sapphire sensor has been made for example in U.S. Patent Application US 2005/0195402 A1. This solution is restricted to a small membrane size, leading to reduced sensitivity, poor reference pressure quality, leading to hysteresis effects and temperature dependence, and to a structure which is difficult to combine with other materials in a robust and leak-tight fashion.

One of the main problems when manufacturing a practical optical sensor for the described purposes, is the mounting of the optical sensor cell to the surrounding instrument chassis, which are usually made of industrial standard metallic alloys. One requires a solution where the mounting would be robust, leak-tight, corrosion resistant, long-lasting, stable and most importantly such that it has a minimal effect on the sensor performance in high temperature and high pressure environment.

The typical sealing method for ceramic high pressure sensors is using polymer o-rings that are sealing directly on the diaphragm. Using sealing rings, such as o-rings, for clamping directly on the diaphragm can easily have a big effect on the signal via non-desired bending of the diaphragm, which moreover can well be temperature dependent. This causes unwanted response and drift of the sensor, which is above the accuracy and long-term stability requirements for oilwell downhole applications and other applications that have similar requirements. Direct clamping of the diaphragm with the level of force required for the sealing of several hundreds of bar of pressure is certain to cause unevenly distributed load across the diaphragm.

One of the main problems in combining different materials, for example ceramic and metal, is the different Coefficient of Thermal Expansion, causing expansion mismatches between parts and thus stress gradients in the structure. Moreover, a high level of stress tends to relax one way or another, for example by creep effects such as movement of dislocations or viscous flow, appearing as long-time drift in the measurement signal.

Polymer based sealing materials are typically not suitable for temperatures above 200° C. and pressures above 20 bar. Metal based sealing materials in combination with sapphire based sensors require high grade of polished surfaces and suffer from sensor cracking under uneven sealing pressure distribution and high point loads. Using ceramic-based sealing surfaces, e.g. alumina instead of sapphire, require soft sealing materials due to the remaining roughness of the polished surface caused by voids in the polycrystalline surface structure (break outs of single grains). In addition polishing increases the probability of cracking which requires additional annealing processes and thus increases cost. The disadvantage of soft sealing materials is their incompatibility with the high temperature, high pressure, corrosive environment and the insufficient elasticity to compensate for minute changes caused by the mismatch in thermal expansion coefficients of the materials involved.

SUMMARY OF THE INVENTION

The inventive sensor which is capable for measuring high pressures at high temperatures is based on the Optical Diaphragm Gauge structure. See U.S. Pat. No. 7,305,888 to Wälchli et al., which is incorporated here by reference.

The invention is a metal sealing system for an optical, interferometric, ceramic pressure sensor, with such a structure that it allows: (a) leak-tight mounting of the sensor cell to a more suitable preferably metallic chassis or other suitable material like quartz; and (b) the usage of external optics, allowing for greater material and dimensional selection of optics and fiber optics, which are used for transferring the used light signal.

Both features (a) and (b) are of great importance especially from the economical point of view.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
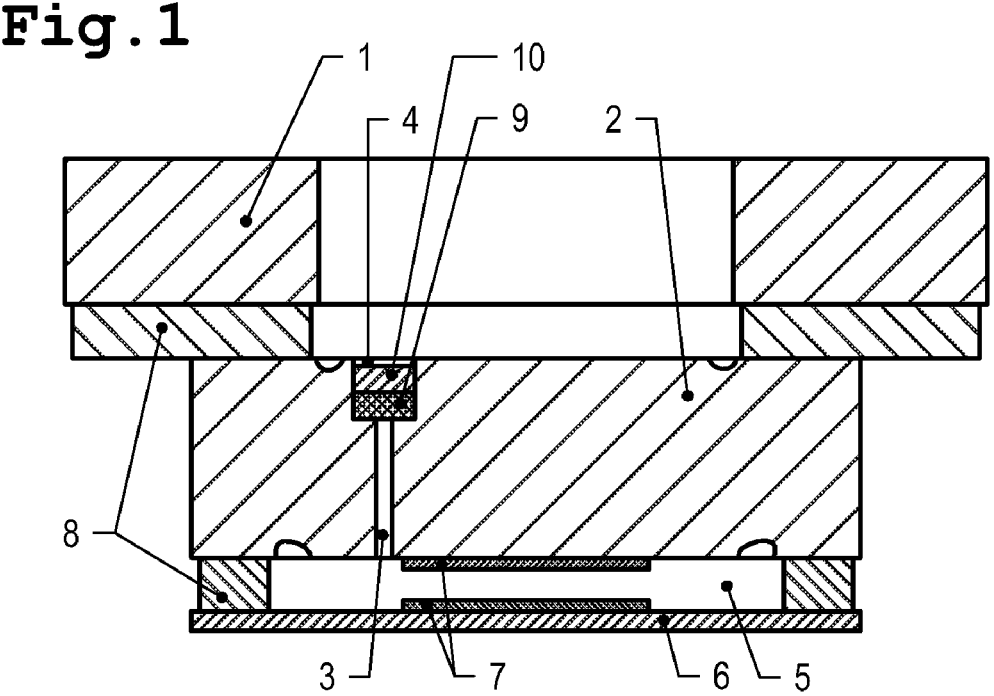
FIG. 1 is a schematic side sectional view of a preferred embodiment of the sensor according to the present invention.
Figure 6:
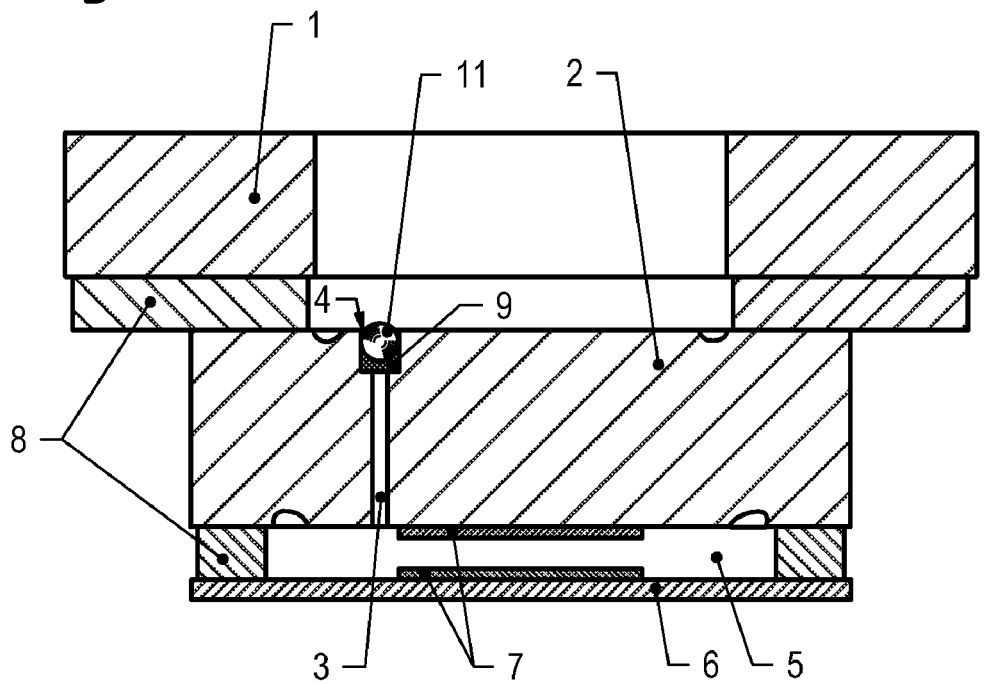
FIG. 6 is a view similar to FIG. 1 of another embodiment of the invention with a sealing ball for closing the port.

Referring now to the drawings, in which like reference numerals are used to refer to the same or similar elements, FIG. 1 illustrates a preferred embodiment of the sensor of the invention which comprises a ceramic supporting body 1, that is preferably disc shaped and preferably made of $Al_2O_3$. In some embodiments, a single-crystal sapphire is used for at least part of the supporting body 1. The sensor also includes a ceramic housing body 2 that is preferably a single-crystal sapphire housing and preferably has a port 3 with a recess 4 for gaining access to a reference chamber 5 of the sensor. Also provided are a single-crystal sapphire diaphragm or membrane 6 with an optical mirror coating 7. Sealing glass 8 is provided to seal the support body 1 to the housing body 2, and to seal the diaphragm 6 to the housing body 2 to form a reference chamber enclosure, and another type of sealing glass 9 and a sealing lid 10 or a ball (see ball 11 in FIG. 6) close the port 3.

Figure 2:
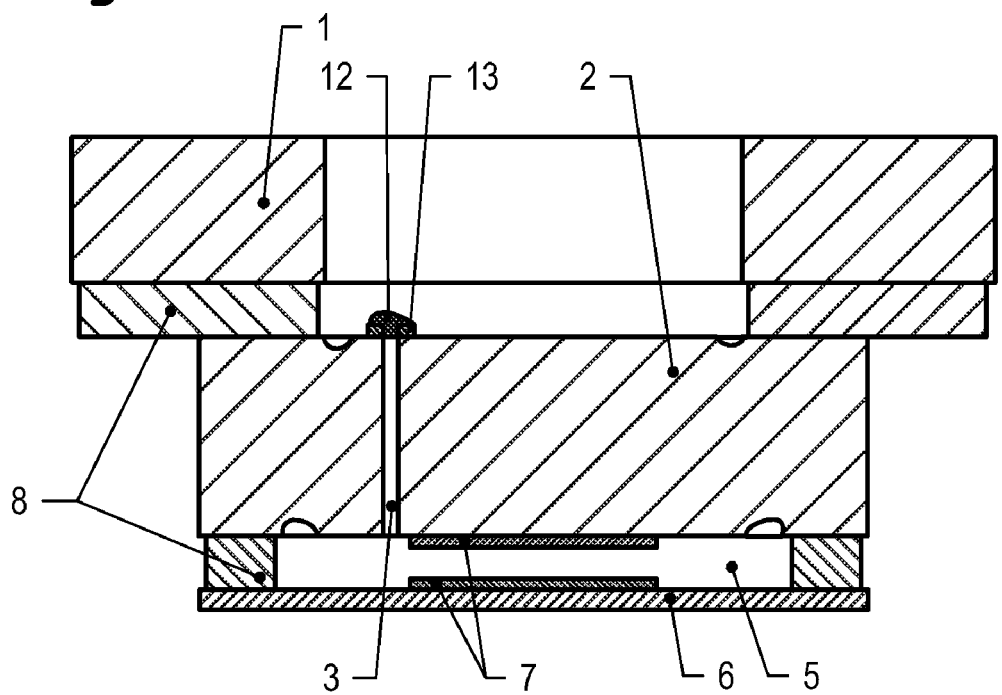
FIG. 2 is a view similar to FIG. 1 but of another embodiment of the invention with metal alloy encapsulation of the reference chamber.
Figure 3:
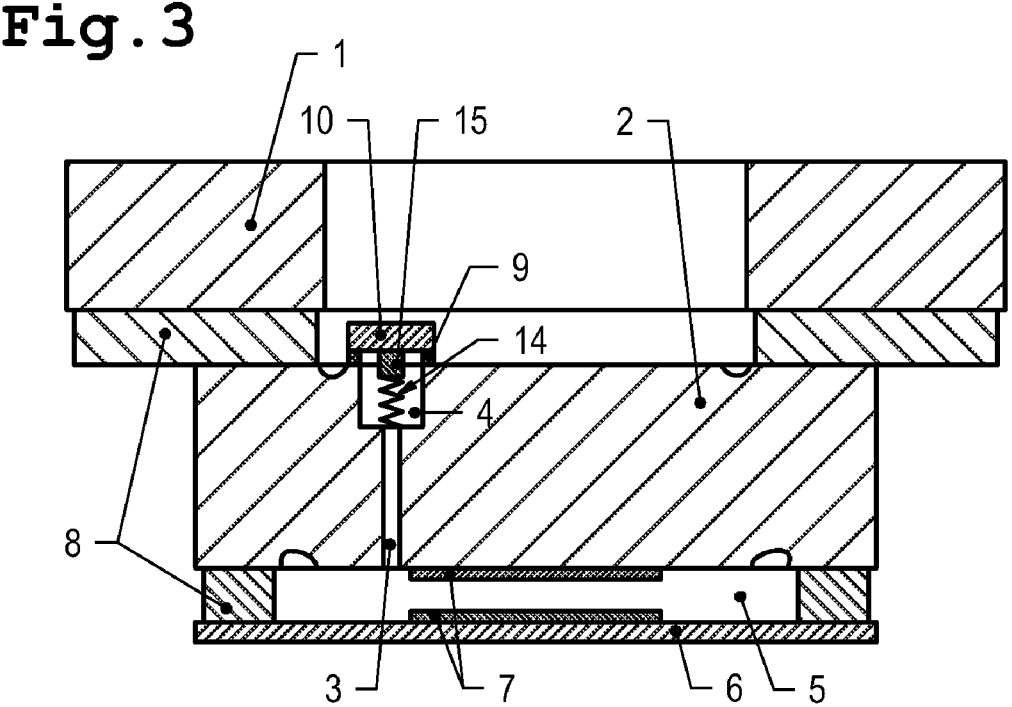
FIG. 3 is a view similar to FIG. 1 of another embodiment of the invention with a getter material arrangement.
Figure 4:
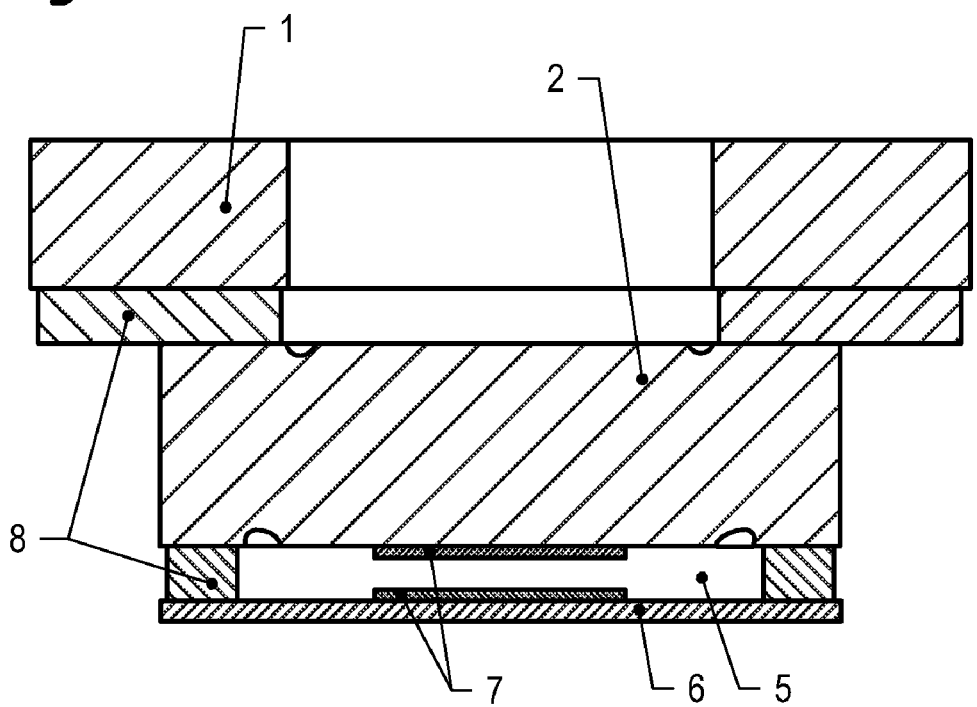
FIG. 4 is a view similar to FIG. 1 of another embodiment of the invention without a port to the reference chamber of the invention.
Figure 5:
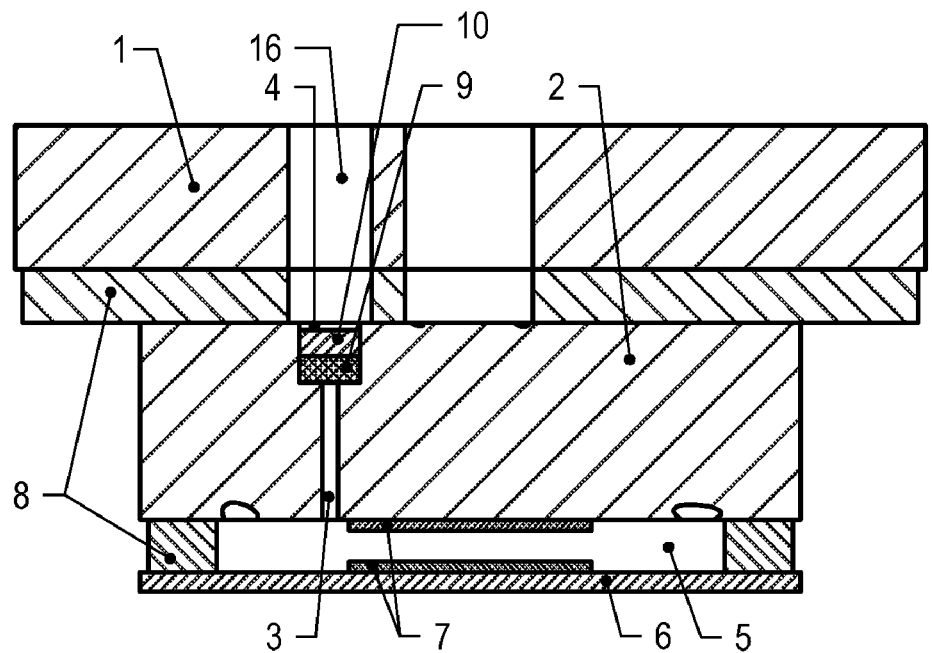
FIG. 5 is a view similar to FIG. 1 of another embodiment of the invention with a through hole in a disc shaped support body.

In other embodiments, as shown in FIG. 2, soldering metal alloys 12 are used along with silver pads 13 to close port 3. In yet other embodiments as shown in FIG. 3, the reference chamber 5 is equipped with getter material 15 and a spring 14 that presses the getter material 15 against the sealing lid 10 at recess 4. In some further embodiments the port to the reference chamber 5 is left out completely as shown in FIG. 4. In the preferred embodiment of FIG. 1, the port 3 in the housing 2 lies outside the disc perimeter. In some embodiments as in FIG. 5, there is a through hole 16 in the ceramic disc or support body 1 to allow access to and closing of the port 3.

The operating principle of the described optical diaphragm gauge is well known (e.g. from U.S. Pat. No. 7,305,888 to Wälchli et al.). A pressure difference between the two different sides of the elastic diaphragm 6 causes the diaphragm to bend and by doing so, changing the optical cavity length accordingly. Light is focused through the sapphire housing onto the diaphragm's semi-reflecting surface from where the light, after experiencing interference phenomenon via multiple reflections between the two mirrors 7, is collected and analyzed using one of the several available methods (e.g. Fizeau interferometer (FISO); White light polarization interferometer (OPSENS); Michelson interferometer; by spectrometer; etc.), revealing the optical cavity length and thus the pressure difference across the diaphragm. The thickness of the membrane or diaphragm 6, together with its free diameter and the desired maximum bending, define the pressure range to be used. The membrane diameter can be for example about 11 mm and its thickness about 300 μm. For vacuum pressure applications preferred ranges for the diaphragm diameter lay in the range of about 5.0 mm to 80 mm and the membrane thickness in the range of about 10 μm to 760 μm.

For the high pressure applications like oilwell downhole applications, the preferred ranges for the diaphragm diameter lay in the range:

$$\omega = \frac{p \cdot r_{diaphragm}^4}{\frac{64 \cdot E_{Diaphragm} \cdot t_{diaphragm}^3}{12 \cdot (1 - v_{diaphragm}^2)}}$$

ω(omega)=deflection of diaphragm
p=pressure applied to diaphragm
E=coefficient of elasticity
v(nu)=Poisson Constant
r=radius of diaphragm.

Examples for preferred values for the thickness of the diaphragm by given values of high pressure and diameter of the diaphragm and with a deflection distance of the diaphragm of 5.5 μm are in the following range:

for 1.0 bar up to 1000 bar:
a) for 2 mm diaphragm diameter: diaphragm thickness range from 0.022 mm to 0.22 mm;
b) for 8 mm diaphragm diameter: diaphragm thickness range from 0.14 mm to 1.4 mm; and
c) for 30 mm diaphragm diameter: diaphragm thickness range from 0.8 mm to 8.0 mm.

Preferred ranges for the diaphragm diameter lay in the range of 2.0 mm to 30 mm and the membrane thickness in the range of 20 μm to 10 mm with a pressure applied in a range from 1.0 bar to 1000 bar.

The distance between the two surfaces is usually established directly during the assembly by means of the sealing material, located between the membrane edge and the housing. In this way one can avoid complex structures in the housing face. It is also possible, but not preferable, to use spacers in order to define the gap. The parallelism between the housing and the diaphragm should be less than 5 mrad, preferably less than 1 mrad, to ensure optimal optical signal and their surface roughness should be better than λ/5, preferably better than λ/10. This seal consists, for example and preferably, of glass paste that is easy to handle and can, for example, be applied by means of screen printing. In addition, sealing of the membrane in the edge zone against the housing can be achieved through welding, for example, laser welding as described in U.S. Patent Application US 2005/0195402A1. Another possibility for achieving a sealing bond is to connect the housing parts diffusively, for example, in the green body state, to completely avoid material other than $Al_2O_3$, or by performing aluminum oxidization bonding as described in Swiss Patent Application CH 00577/07 to Bertsch et al.

A process description of sealing glass printing, sintering, etc is described in U.S. Pat. No. 6,528,008 entitled "Process for producing membrane for capacitive vacuum measuring cell," to Bjöorkman.

In a typical measuring cell with an external diameter of 11 mm and a free inner membrane diameter of 8 mm, the gap distance is approximately 2 to 50 μm, preferably 10 to 30 μm. In this preferred example the support disc or body 1 has a thickness of 2 to 10 mm and the housing body 2 has the same thickness. The housing and the disc must be made of materials having similar thermal expansion coefficients as the used diaphragm material. Very suitable combinations are high purity alumina ceramics (purity>96%, preferably>99.5%), sapphal ceramics (alumina having a purity above 99.9%) and sapphire (single crystal high purity alumina, artificial corundum). The materials can also be used in combination. For example the housing body 2 can be made of ceramic material like alumina and include a window of sapphire which allows to pass the light into the cell arrangement 17 shown in FIG. 7.

The surface of the partially reflecting diaphragm can be used as such, or it can be optically coated, preferably with a single layer of dielectric material, such as $Ta_2O_5$, with a typical thickness of 70-80 μm, producing close to the optimal 30% of reflectivity, or by other means described e.g. in U.S. Pat. No. 7,305,888 to Wälchli et al. The interferometric surface of the housing, which also acts as a mirror, should be treated in a similar way.

Sealing of the reference chamber 5 can be done by various methods. A known arrangement to achieve a high-quality reference vacuum is described in U.S. Pat. No. 6,591,687 and this method can be used in the construction described here as well. However, the absolute reference vacuum quality is less significant when one builds a sensor meant for very high pressures, up to 1000 bar. In such cases it is not necessary to use getter material for maintaining the reference vacuum as the effects coming from residual gas content in the reference vacuum on the performance are insignificant. For example, if the reference chamber has a pressure which is about 0.01% of the Full Scale (FS) of the sensor (representing e.g. 10 mbar with a Full Scale of 100 bar), the resulting error coming from expansion of reference gas is only about 0.02% of FS. Using ceramics, such as $Al_2O_3$, one minimizes outgassing in the reference chamber thus enabling one to achieve a reference pressure significantly below 1 mbar without using a getter solution. In this case one first manufactures the sensor consisting of the diaphragm, the housing and the disc. The housing is built to include a port through which the reference chamber is accessible. Depending on the dimensions of the sensor, the disc may have a hole meant for sealing of the port. The sensor is placed inside a vacuum chamber where the entire structure is evacuated and the sealing of the port is then performed by attaching a plug, for example a sapphire or glass lid or a ball, by means of glass solder to seal the port, so that it forms a leak-tight structure. One can also use metallic solder alloys to seal the port, which requires an extra manufacturing step where preferably a silver pad is formed onto the sapphire housing, around the port, preferably by means of screen printing, to allow solder alloy to create a leak-tight sealing (see method described e.g. in U.S. Pat. No. 6,528,008 to Bjoerkman entitled: "Process for producing membrane for capacitive vacuum measuring cell"). In all of these sealing methods the maximum process temperature is held low enough to prevent the re-melting of the already-made seals.

Due to effects of, for example, absorption/adsorption/desorption on the sensor, a poor reference chamber vacuum quality can cause time delays, hysteresis and enhanced reaction to temperature changes. This is more significant in the lower full scale range and with higher process stability and resolution requirements. In some cases a reduced atmosphere can be sufficient as a reference chamber pressure (e.g. 300 mbar), especially when one has only slow variations of surrounding temperature and a high FS pressure. This kind of a reduced atmosphere is automatically achieved when the sensor sealing temperature is more than the surrounding temperature, resulting in a pressure:

$$P_2 = T_2/T_1 * P_1,$$

where $T_1$ is sealing temperature (K), $T_2$ ambient temperature (K) and $P_1$ ambient pressure.

For example sealing the sensor in about 700° C. and atmospheric pressure results in about 300 mbar reference pressure when cooling down to room temperature.

The diaphragm 6 is preferably made of sapphire. Sapphire is defined here as a single crystal aluminum oxide ($Al_2O_3$; artificial corundum) with a definite crystal orientation. Therefore many physical parameters are dependent on direction. This material choice has many advantages in the described application field:

It is corrosion resistant to many acids and gases such as fluorides ($NF_3$, $CH_2F_2$, $SF_6$, $CF_4$, $CHF_3$) and chloride (e.g. $Cl_2$, HCl), bromides (e.g. HBr) gases or water vapor.

Since it is monocrystalline it has a smooth surface allowing smoother mirror surfaces.

It has a high flexural strength.

The diaphragm 6 and the housing 2 are cut from single crystal sapphire so that the optical axis of the structure is parallel with the C-axis of sapphire. This is to minimize the birefringence effects of crystalline structure on the light beam traveling through it and also to allow symmetrical thermal expansion.

Figure 7:
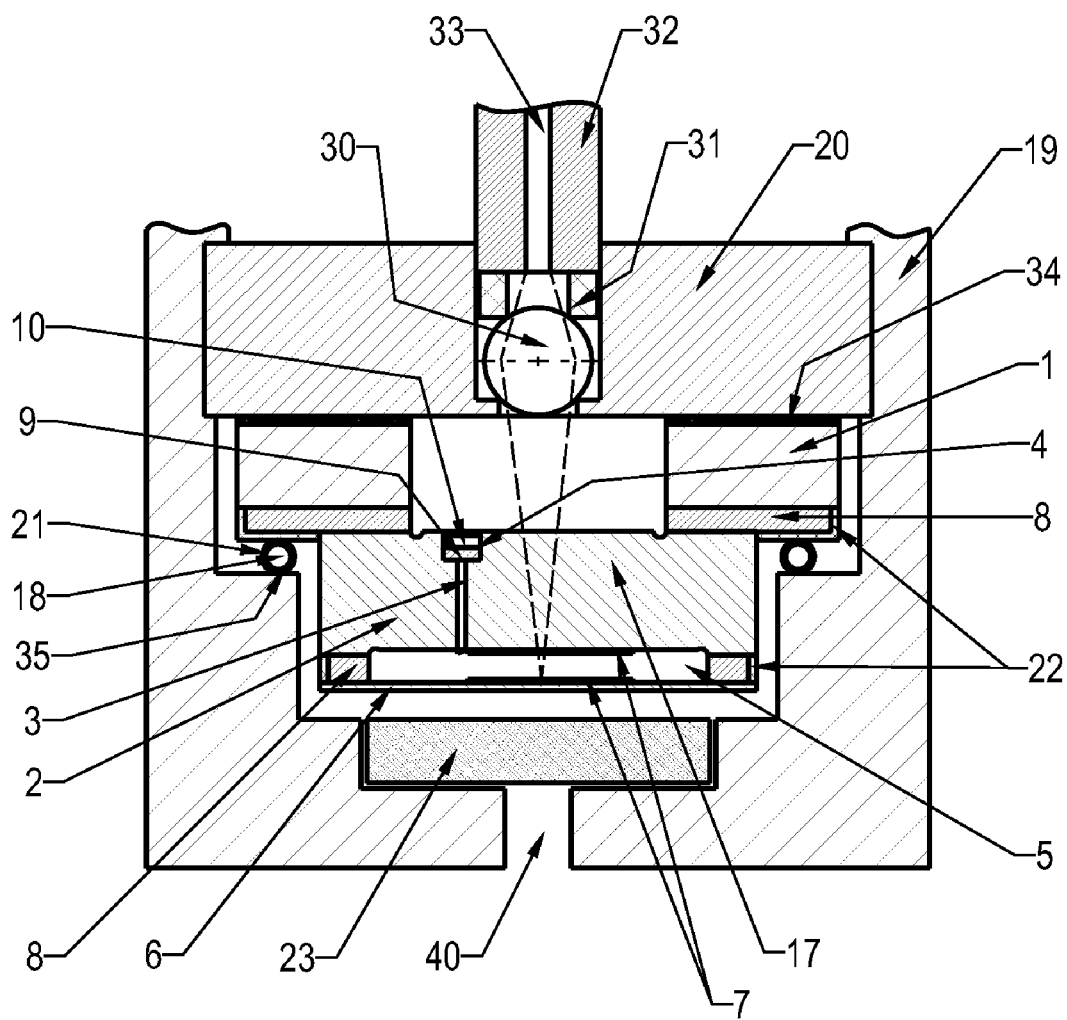
FIG. 7 is a side sectional view illustrating a packaging method of a fiber optic sensor cell into metal casing according to the invention.

With reference to FIG. 7, in high pressure conditions it is essential that the structure is mounted to the tubular sensor casing 19 (i.e. a packaging) with proper materials and with enough force. Due to practical manufacturing as well as economical reasons the entire measurement instrument is not manufactured using ceramic material described above. The materials of choice for the sensor casing 19 are preferably metals like stainless steel, nickel chromium alloys or other high performance metal materials. Process compatible materials other than metals can also be used, preferably ceramics or quartz. Combining the ceramic cell 17 with the metal casing structure 19 is preferably done by seal clamping, e.g. pressing the structure against a metal ring seal 18 producing a leak tight structure. In the invention the clamping of the cell is performed against the ceramic support disc or body 1 that is sandwiched between pressing means like a pressing piece 20 on one side and the sensor support disc with the metal ring 18 on the other side. The optical path includes an optical fiber 33 surrounded by a coating 32 or a ferrule and is arranged outside of the ceramic housing body 2 to feed the light through said body directed to the surface of the diaphragm 6.

At least in the central area of the housing body 2, an optically transparent window is formed and opposite to this window, at least an area of the surface of the diaphragm 6 is formed to be optically reflective, and outside of the reference vacuum chamber 5, opposite to and at a distance from this window, the optical fiber 33 is arranged for feeding light in and out, and onto the surface of the diaphragm 6. A lens 30 is between the optical fiber 33 and the window of body 2, for optically linking to the surface of the diaphragm 6 in such a way that the arrangement forms a measuring section for determining the level of deflection of the diaphragm 6 by detecting with a Fabry-Perot Interferometer. Between the lens 30 and the fiber 33, a fixation element 31 can be arranged.

The housing body 2 consists at least partially of alumina ceramic from the type sapphire and this part is placed in the central area forming an optical window or the whole body can be made of optically transparent sapphire material. For saving on use of the expensive sapphire material, this window can be formed as a single insertion part made of sapphire, that it is mounted with a vacuum tight seal to the housing body 2.

A further preferred arrangement uses an optical fiber 33 which is integrated directly into the ceramic housing body of the pressure measuring cell arrangement 17, without using a lens 30. At least an area of the surface of the diaphragm 6 is formed to be optically reflective and, opposite to this area, an optical fiber 33 is sealably embedded within the housing body 2 and which end is touching the reference vacuum chamber 5 for feeding in and out light onto the reflective surface of the diaphragm 6 in such a way that the arrangement forms a measuring section for determining the level of deflection of the diaphragm 6 by detecting with a Fabry-Perot Interferometer.

The solution according the invention includes the ceramic diaphragm pressure measuring cell 17 comprising:

the housing body 2 made of $Al_2O_3$ ceramic or sapphire material;

the diaphragm 6 made of $Al_2O_3$ ceramic or sapphire material and arranged proximate to said housing body 2, the diaphragm 6 being substantially planar and having a peripheral edge, the peripheral edge of the diaphragm 6 being joined by a first edge seal 8 to said housing body 2 in such a way that a reference chamber 5 is created between the housing body 2 and the diaphragm 6, said diaphragm 6 having first and second opposing surfaces, the first surface of the diaphragm 6 facing the housing body 2 and the housing body 2 having a surface facing the diaphragm 6 whereas the outer surface of this diaphragm 6 is exposed by measuring port means 40 for connecting the ceramic diaphragm measuring cell 17 to a medium to be measured and at least in the central area of the housing body 2, means for detecting the deflection of the diaphragm 6 are arranged to produce a pressure signal;

a ceramic supporting body 1 attached to the back side of the housing body 2 by sealing glass 8 including a surface area overhanging and surrounding the housing body 2 and forming a first sealing surface; and a tubular metal casing 19 which incorporates the ceramic diaphragm pressure measuring cell 17, hold and mounted to the ceramic support body 1 whereas said tubular metal casing 19 includes inside, a second surrounding sealing surface corresponding to the first sealing surface, and between these sealing surfaces a metal ring seal 18 is arranged sealably pressed together by pressing means arranged on the back side of the ceramic supporting body 1.

In order to avoid impact of the sealing forces on the diaphragm 6 and thus on the sensor reading, the support disc 1 made of sapphire or ceramic, preferably alumina, is attached to the sensor cell in a way that the optical path is not interrupted. The metal seal then is pressed against this support disc, which is greatly reducing clamping stress and bending of the diaphragm and thus avoids stress relief over time generally recognized as drift of the sensor. The support body 1, preferably a support disc, is attached to the sapphire sensor cell by known glass or metal based bonding processes resulting in a leak tight and mechanically robust joint. This solution enables one to keep the sensor parts as simple as possible, further improving the strength of the structure and also to reduce cost.

Machining single crystal sapphire is a risky (and expensive) operation, possibly leaving uneven surface that could later significantly contribute to cracking of the sensor structure when pressed against a seal with great force, especially in the case of complex recesses and similar features. Polycrystalline $Al_2O_3$ has a more isotropic structure and thus it is easier to maintain quality after machining and is cheaper that single crystal sapphire.

Single crystal sapphire and especially polycrystalline ceramic materials such as alumina are difficult materials to make leak-tight against a metal seal, the latter due to a 'grainy' polycrystalline surface structure and the former due to difficulties and cost of polishing the sealing surfaces to the required roughness grade (Ra) to below 0.006 μm, preferably to 0.003 μm to 0.001 μm. Such grades can be achieved by electrochemical polishing.

In order to fill in the voids and smoothen the surface of the polycrystalline material, at least portions of the sealing section of the ceramic support disc 1 is overglazed (e.g. by glass seal 8). It is this glass layer which allows the use of high melting point and corrosion resistant metal sealing materials, which otherwise would require much higher sealing forces and which consequently would lead to cracking of the support disc 1. The thin glass layer in the range of 5 to 100 μm, preferably in the range of 5-20 μm, on the sapphire/ceramic support disc 1 is resistant to high loads created by the sealing geometry and the necessary sealing forces in the range of 150-300 N/mm at the circumference. The preferred and economical solution for the glazing is to use the same method for applying the sealing glass as used for bonding the additional disc to the sensor cell. For a number of corrosive applications the corrosion resistance of the glass is sufficient, for increased corrosion resistance the surface of glass seal 8 can be coated with corrosion resistant materials 22, preferably alumina, created with standard thin film coating processes such as PVD, CVD, ALD, etc.

Values for appropriate glass pastes are given in the table below:

| Glass Paste baking temp. Description | Baking (=sealing) temp ° C. |
| --- | --- |
| Low | 500 |
| Intermediate | 550-625 |
| High | 700-730 |
| Very high | 1350 |

Figure 8:
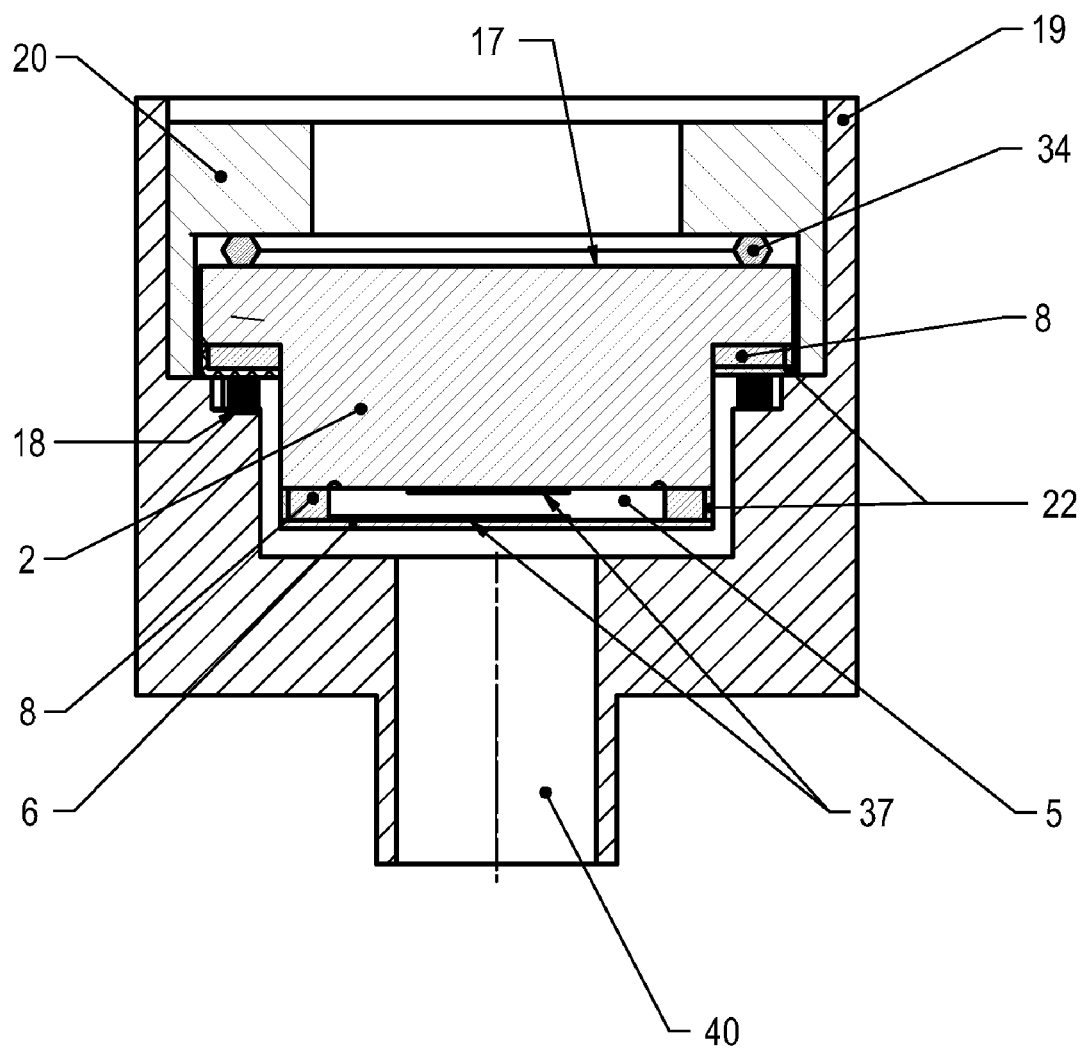
FIG. 8 is a sectional view illustrating a mounting of a ceramic/sapphire cell with optical readout for pressure measurement in a high purity gas flow application according to the invention.

In another configuration the sealing surface is part of single piece of sapphire/ceramic combining the function of holding the diaphragm and providing the sealing surface as shown in FIG. 8. The sealing surface can either be polished to the necessary sealing surface grade or coated with glass as described with ceramic materials.

The metal seal 18 is preferably machined out of bulk material rather than the typically bended and welded metal seals that require reworking of the welding seam. Various forms and shapes of the metal seals are possible, starting from simple o-ring shapes (as in FIG. 7) to complex shapes that create additional sealing forces under operating pressures. The metal seal requires being compatible with high temperature, high pressure and corrosive environment and needs a certain level of resiliency in the range of 1%-5% of the diameter, preferably above 3% in order to compensate for gap variations caused by different thermal expansion coefficients and high pressure loads. Preferable materials in combination with sapphire and ceramic sensors are nickel chromium alloys or low thermal coefficient stainless steel. Reasonably soft or ductile coatings, preferably thin metal coatings 21 on the metal ring 18, e.g. silver, nickel or copper or preferably gold, help to seal against any remaining irregularities of the facing sealing surfaces. Typical thickness of the coating 21 is in the range of 1 to 50 μm, preferably in the range of 5 to 20 μm.

Figure 9:
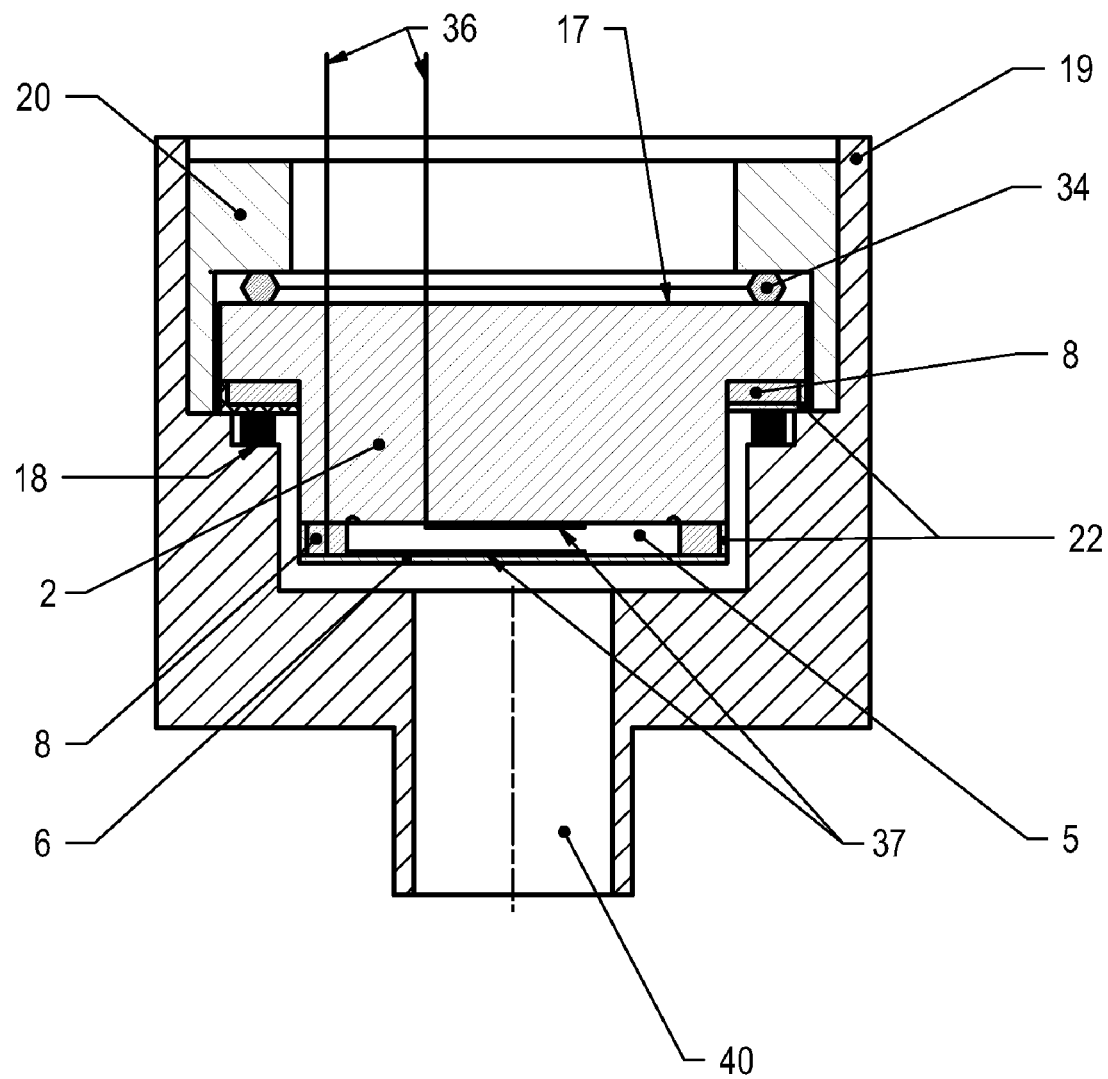
FIG. 9 is a view similar to FIG. 8 of a ceramic/sapphire cell using capacitance measuring technology for pressure measurement in a vacuum application according to the invention.

With respect to FIGS. 7, 8 and 9, the metal seal 18 can also be coated with an oxide film 21 preferably of $Al_2O_3$ ceramic. Such a coating can be applied in addition with the afore mentioned metal coating forming a multilayer arrangement or be applied as a single film. This oxide layer is very thin and pinhole free and ductile enough that it becomes not destroyed or develops no cracks when it is compressed and it still can follow irregularities on the facing seal surface. It is advantageous to deposit such film with an ALD (Atomoc Layer Deposition) process. The thickness of this oxide film is in the range of 3 to 20 atomic layers. Using such an oxide film creates the possibility of a metal free application in a way that it forms a protection coating that no metal material is exposed against the process. Some processes use aggressive gas or chemicals which would corrode and dissolve the metal and therefore contaminate the process undesirably. This can be avoided with such an oxide coating.

It is a further advantage if the sealing glass 8 outside of the region of the housing body 2 attached to the ceramic supporting body 1 is coated with a corrosion resistant coating 22, preferably with alumina.

The metal casing provides measuring port means 40 like the access port of the pressure media to exert force on the sensor diaphragm and protects the rest of the sensor from being exposed to the media and the environment by means of the leak tight metal sealing between the sensor 17 and the metal casing. The sealing surface 35 of the metal casing is machined to the necessary sealing surface grade, preferably N5c (Ra value 0.4 µm, concentric). Between the access port 40 and the measuring cell, a porous filter 23 can be arranged to protect the cell.

The pressing piece 20 can either be formed as a disc lying flat on the ceramic support body, preferably a support disc, or a ring of the same size as the metal seal on the opposite side of the support disc. A softer material, e.g. in the form of a metallic ring 34, can be sandwiched between the pressing piece 20 and the support disc 1 in order to accommodate minute non-parallelism of the pressing piece and the ceramic support disc. Additionally the thickness of such material can be designed such that it compensates for the gap variations caused by temperature variations and the mismatch of the thermal expansion coefficients. The metallic ring 34 is on the same axis and radius as the metal ring seal 18 and is positioned between the backside of the ceramic support body 1 and the pressing means 20. The metallic ring 34 material is soft enough to be molded by the ceramic surface structure and hard enough not to creep under the pressure applied.

Measuring cells and the sealing system designed as described above can be very compact and economical to produce.

Summarizing, the invention includes:

a new method and structure for sealing the reference chamber of sapphire/ceramic sensor cell for high temperature and high pressure applications, especially suitable for downhole pressure measurement application like preferably for oilwell downhole applications;

a metal (or process-compatible materials other than metals can also be used, preferably ceramics or quartz) to sapphire/ceramic sealing system which is detachable, gas tight, corrosion resistant and suitable for high temperature and high pressure applications, and involves glazing of the ceramic support disc with glass to smoothen the surface, corrosion protective coating of the glass and a plated metal seal, which acts as resilient sealing member; and a sensor cell mounted to sapphire/ceramic support structure therefore reducing clamping stress on the diaphragm and thus drift of the sensor cell.

The cell arrangement is a high pressure measuring arrangement especially suitable in a range from at least 1.0 bar to 200 bar and preferably from at least 1.0 bar to 500 bar or even more and preferably used as high temperature pressure measuring arrangement in environments with temperatures in a range from at least 150° C. to 400° C. and preferably from at least 150° C to 650° C.

Further Advantages of the Invention

Depending on the materials selection very high temperatures even above 1000° C. are possible.

Beside the applications in the field of oil recovery, this invention is applicable in other fields were high temperatures and corrosion resistance are required, e.g. combustion processes.

This invention can also be applied in conjunction with sapphire/ceramic sensors using capacitive or other methods to measure the diaphragm deflection instead of the optical method described above.

This invention can also be applied were only one or more of the features, e.g. corrosion resistance and easy to detach sensor in semiconductor manufacturing instrumentation, is required.

Other Applications

The sealing technology described here is not restricted to high temperature and high pressure applications in oil wells. The sealing technology can also be used at lower temperatures and in other industries.

The same sealing technology can be used for example in the semiconductor and related industry. In this application ceramic/sapphire sensors are fastened to the housing using the same metal o-ring technology. The ceramic includes also ceramic types of SiC and/or AlN material.

FIG. 8 shows a mounting of a ceramic/sapphire cell with optical readout for pressure measurement in a high purity gas flow application and FIG. 9 shows a mounting of a ceramic/sapphire cell using capacitance measuring technology for pressure measurement in a vacuum application. In this case inside the reference chamber the surface of the membrane 6 and the housing body 2 in the opposing area is coated at least partially with electric conductive layers 37 forming a pressure depending capacitor which is connected through connecting lines 36 feed out to the outside placed read out electronic. In both FIGS. 8 and 9, it is depicted that the supporting body 1 is combined with the housing body 2 of the cell to one single piece. In this case one bonding step can be avoided. This housing body 2 can also have different shapes as, for example, includes some bulge or asymmetric arrangement at the upper side if needed for mounting purposes.

Referring back to FIG. 7, if the surface roughness Ra of the sealing surface 35 of the metal casing 19 is below 0.4 µm or the temperature is below 200° C. then the metal o-ring 18 may not be coated with a metal thin film.

In different applications the thin film coating 21 of the metal o-ring can be different from the one described above. The thin film coating should be selected such that the thin film is corrosion resistant to the gases, liquids or fluids used in that industry. For the semiconductor and related industry coating materials could be aluminum, silver, copper, nickel, indium, or platinum or even an oxide like alumina. In oil well application the preferred coating material is gold. The thin film should also be soft enough to conform to and follow the surface structure of the contact materials.

The use of the presented sealing technology is not restricted to temperatures above 200° C. when organic sealing materials fail. Below 200° C. organic sealing materials such as Viton, a hexafluoropropylene-vinylidene fluoride co-polymer, or other materials are typically used in sealing technology. However, metal sealing works at this temperature as well.

The reference numeral in FIGS. 7, 8 and 9, designate the can functional parts as in FIGS. 1-6, so that their detailed description is not repeated.

While a specific embodiments of the invention have been shown and described in detail to illustrate the application of the principles of the invention, it will be understood that the invention may be embodied otherwise without departing from such principles.

Prior Art

Fiber attachment to ferrule:
 Published U.S. Patent Application US 2005/0195402.

Complete sensors available from:
 Taitech;
 Luna Innovations;
 FISO Technologies Inc., 500 St-Jean-Baptiste Ave., Suite 195, Québec, QC G2E 5R9, Canada; and
 Davidson Instruments.

Patents:

US 2005/0195402, "Crystalline optical fiber sensors for harsh environments," Virginia Polytechnic Institute, (thermally fused sapphire construction using different ceramics, reference vacuum not controlled, size (pressure sensitivity) restricted);

EP 0 461 459, "Druckmessumformer mit einem rotationssymmetrischen Drucksensor aus Keramik" (Printing transducers with a rotationally symmetric pressure sensor from ceramics), to Obermeier and Altiok.

EP 0 372 988, "High pressure package for pressure transducers," to Bishop.

U.S. Pat. No. 6,591,687, "Capacitive vacuum measuring cell," to Bjoerkman et al.

U.S. Pat. No. 6,528,008, "Process for producing membrane for capacitive vacuum measuring cell," to Bjoerkman.

US 2005/0195402, "Crystalline optical fiber sensors for harsh environments," to May and Coggin.

U.S. Pat. No. 7,305,888, "Optical interferometric pressure sensor," to Wälchli et al.

Swiss Patent CH 00577/07, "Verfahren zur Herstellung einer Vakuummembranmesszelle" (Procedure for the production of a vacuum diaphragm measuring cell), to Bertsch et al.

Articles:

Hai Xiao, Jiandong Deng, Zhiyong Wang, Wei Huo, Po Zhang, Ming Luo, Gary R. Pickrell, Russell G. May and Anbo Wang, Fiber optic pressure sensor with self-compensation capability for harsh environment applications, Optical Engineering, 44(5), 054403-054413, 2005, (This is an article about a FO sensor made by thermal fusion.).

Yizheng Zhu, Zhengyu Huang, Fabin Shen, and Anbo Wang, Sapphire-fiber-based white-light interferometric sensor for high-temperature measurements, Optics Letters, 30(7), 2005. (describing a sapphire sensor built using alumina adhesive).

Yizheng Zhu, and Anbo Wang, Miniature Fiber-Optic Pressure Sensor, IEEE Photonics Technology Letters, 17(2), 2005, (Describes a silica pressure sensor).

Zhengyu Huang, Wei Peng, Juncheng Xu, Gary R. Pickrell, Anbo Wang, Fiber temperature sensor for high-pressure environment, Optical Engineering, 44(10), 104401, 2005, (thermal fusing, this time borosilicate glass).

Totsu, K., Haga, Y., Esashi, M., Vacuum Sealed Ultra Miniature Fiber-Optic Pressure Sensor Using White Light Interferometry, *TRANSDUCERS, Solid-State Sensors, Actuators and Microsystems, 12th International Conference on,* 2003, Publication Date: 8-12 Jun. 2003, Volume: 1, pages 931-934, ISBN: 0-7803-7731-1, (Describes a sensor with a reference vacuum, sensor being made out of silica on the tip of a silica fiber).

Books:

Lopez-Higuera, J. M., Handbook of Optical Fiber Sensing Technology, Wiley, 2002.

What is claimed is:

1. A diaphragm pressure measuring cell arrangement comprising:
    a ceramic diaphragm pressure measuring cell (17) comprising a housing body (2) made of material selected from the group consisting of: $Al_2O_3$ ceramic and sapphire material, the housing body having a front side and a back side;
    a diaphragm (6) made of material selected from the group consisting of: $Al_2O_3$ ceramic and sapphire material; arranged proximate to said housing body, said diaphragm being substantially planar and having a peripheral edge, the peripheral edge of said diaphragm being joined by a first edge seal (8) to said housing body to form a reference vacuum chamber (5) between said housing body and said diaphragm, said diaphragm having first and second opposing surfaces, the first surface of said diaphragm facing said housing body and said housing body having a surface facing said diaphragm, the second surface of the diaphragm being an outer surface exposed by measuring port means (40) for connecting the ceramic diaphragm measuring cell to a medium to be measured, and at least in a central area of the housing body, means for detecting deflection of the diaphragm to produce a pressure signal;
    a ceramic supporting body (1) attached to the back side of the housing body (2) by sealing glass (8) including a surface area overhanging and surrounding the housing body and forming a first sealing surface, said ceramic supporting body having a back side;
    a tubular sensor casing (19) for receiving said ceramic diaphragm pressure measuring cell and for holding and mounted said ceramic support body, said tubular sensor casing including an inside second surrounding sealing surface corresponding to the first sealing surface;
    a metal ring seal (18) between said first and second sealing surfaces; and
    pressing means (20) arranged on the back side of the ceramic supporting body for pressed said first and second sealing surfaces together.

2. A diaphragm pressure measuring cell arrangement according to claim 1, wherein said metal ring seal (18) has a surface that is coated by a ductile material (21).

3. A diaphragm pressure measuring cell arrangement according to claim 1, wherein said metal ring seal (18) has a surface that is coated by a ductile metal (21).

4. A diaphragm pressure measuring cell arrangement according to claim 1, wherein said metal ring seal (18) has a surface that is coated by gold (21).

5. A diaphragm pressure measuring cell arrangement according to claim 1, wherein said metal ring seal (18) has a surface that is coated by a ceramic material (21).

6. A diaphragm pressure measuring cell arrangement according to claim 1, wherein an attachment of the ceramic supporting body (1) to the back side of the housing body (2) includes a sealing glass (8) between at least parts of the ceramic support body (1) and the housing body (2).

7. A diaphragm pressure measuring cell arrangement according to claim 1, wherein said metal ring seal (18) has a surface that is coated by a ductile material (21), an attachment of the ceramic supporting body (1) to the back side of the housing body (2) including a sealing glass (8) between at least parts of the ceramic support body (1) and the housing body (2), the sealing glass (8) being on the first sealing surface and in contact with the metal ring seal.

8. A diaphragm pressure measuring cell arrangement according to claim 1, wherein an attachment of the ceramic supporting body (1) to the back side of the housing body (2) includes a sealing glass (8) between at least parts of the ceramic support body and the housing body, and wherein the sealing glass, outside of a region where the housing body is attached to the ceramic supporting body, is coated with a corrosion resistant coating (22).

9. A diaphragm pressure measuring cell arrangement according to claim 1, wherein an attachment of the ceramic supporting body (1) to the back side of the housing body (2) includes a sealing glass (8) between at least parts of the ceramic support body and the housing body, and wherein the sealing glass, outside of a region where the housing body is attached to the ceramic supporting body, is coated with a corrosion resistant coating of alumina (22).

10. A diaphragm pressure measuring cell arrangement according to claim 1, wherein the ceramic supporting body (1) is a disc shaped body.

11. A diaphragm pressure measuring cell arrangement according to claim 1, wherein said diaphragm (6) is made from alumina ceramic $Al_2O_3$ that is sapphire.

12. A diaphragm pressure measuring cell arrangement according to claim 1, wherein said housing body (2) consists at least partially of alumina ceramic from the type sapphire and wherein said sapphire is at a central area of the housing body to forming an optical window in the housing body.

13. A diaphragm pressure measuring cell arrangement according to claim 1, wherein said housing body (2) consists at least partially of alumina ceramic from the type sapphire and wherein said sapphire is at a central area of the housing body to forming an optical window in the housing body, said window being a single insertion part made of sapphire and mounted with a seal and being vacuum tight to the housing body (2).

14. A diaphragm pressure measuring cell arrangement according to claim 1, wherein at least in a central area of the housing body (2), an optical transparent window is formed and opposite to said window, at least an area of a surface of the diaphragm (6) is formed to be optically reflective, and outside of the reference vacuum chamber (5) and opposite to and at a distance from the window, an optical fiber (33) is arranged for feeding in and out, light onto the surface of the diaphragm (6) and including a lens (30) between the optical fiber and the window for optically linking light to the surface of the diaphragm (6) in such a way that the arrangement forms a measuring section for determining a level of deflection of the diaphragm (6) for detecting with a Fabry-Perot Interferometer.

15. A diaphragm pressure measuring cell arrangement according to claim 1, wherein at least an area of the surface of the diaphragm (6) is formed to be optically reflective and opposite said optically reflective area an optical fiber (33) is sealably embedded within the housing body (2), the optical fiber having an end extending to the reference vacuum chamber for feeding in and out light onto the reflective surface of the diaphragm in such a way that the arrangement forms a measuring section for determining the level of deflection of the diaphragm (6) by detecting with a Fabry-Perot Interferometer.

16. A diaphragm pressure measuring cell arrangement according to claim 1, wherein the surface of the diaphragm (6) opposite the surface of the housing body (2), is coated at least partially with an electric conductive material forming a capacitor which allows detecting a deflection of the diaphragm by measuring a capacitance change.

17. A diaphragm pressure measuring cell arrangement according to claim 1, wherein the cell arrangement is a high pressure measuring arrangement in a range from at least 1.0 bar to 500 bar.

18. A diaphragm pressure measuring cell arrangement according to claim 1, wherein the cell arrangement is a high temperature pressure measuring arrangement in a range from at least 150° C. to 650° C.

19. A diaphragm pressure measuring cell arrangement according to claim 1, wherein the cell arrangement is a high vacuum pressure measuring arrangement.

20. A diaphragm pressure measuring cell arrangement according to claim 1, wherein the cell arrangement is an oil-well high pressure measuring arrangement.

21. A diaphragm pressure measuring cell arrangement according to claim 1, including a metallic ring (34) on a same axis and radius as the metal ring seal (18) and positioned between a back side of the ceramic support body (1) and pressing means (20) and the metallic ring (34) material is soft enough to be molded by the ceramic surface structure and hard enough not to creep under an applied pressure.

22. A diaphragm pressure measuring cell arrangement according to claim 1, wherein the ceramic supporting body (1) together with the housing body (2) consists of one single piece of the same material.

\* \* \* \* \*